(12) United States Patent
Reisswig

(10) Patent No.: US 11,557,140 B2
(45) Date of Patent: Jan. 17, 2023

(54) MODEL-INDEPENDENT CONFIDENCE VALUES FOR EXTRACTED DOCUMENT INFORMATION USING A CONVOLUTIONAL NEURAL NETWORK

(71) Applicant: SAP SE, Walldorf (DE)

(72) Inventor: Christian Reisswig, Berlin (DE)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 17/107,223

(22) Filed: Nov. 30, 2020

(65) Prior Publication Data
US 2022/0171967 A1 Jun. 2, 2022

(51) Int. Cl.
*G06V 30/416* (2022.01)
*G06F 40/30* (2020.01)

(52) U.S. Cl.
CPC .......... *G06V 30/416* (2022.01); *G06F 40/30* (2020.01)

(58) Field of Classification Search
CPC .. G06V 30/416; G06V 10/454; G06V 30/414; G06V 10/82; G06F 40/30
See application file for complete search history.

(56) References Cited

U.S. PATENT DOCUMENTS

| 10,540,579 B2 | 1/2020 | Reisswig et al. | |
|---|---|---|---|
| 2018/0181866 A1* | 6/2018 | Dalle | G06N 5/025 |
| 2019/0354818 A1* | 11/2019 | Reisswig | G06V 30/414 |
| 2020/0117961 A1 | 4/2020 | Reisswig et al. | |
| 2020/0184287 A1* | 6/2020 | Meena | G06V 30/127 |
| 2021/0019287 A1* | 1/2021 | Prasad | G06V 30/412 |

OTHER PUBLICATIONS

Guo, C. et al., "On Calibration of Modern Neural Networks," downloaded from https://arxiv.org/abs/1706.04599, 14 pages, Aug. 3, 2017.
Kendall, A. et al., Bayesian SegNet: Model Uncertainty in Deep Convolutional Encoder-Decoder Architectures for Scene Understanding, downloaded from https://arxiv.org/abs/1511.02680, 11 pages, Oct. 9, 2016.

\* cited by examiner

*Primary Examiner* — King Y Poon
*Assistant Examiner* — Michael L Burleson
(74) *Attorney, Agent, or Firm* — Sterne, Kessler, Goldstein & Fox P.L.L.C.

(57) ABSTRACT

Disclosed herein are system, method, and computer program product embodiments for correcting extracted document information based on generated confidence and correctness scores. In an embodiment, a document correcting system may receive a document and document information that represents information extracted from the document. The document correcting system may determine the correctness of the document information by processing the document to generate a character grid representing textual information and spatial arrangements for the text within the document. The document correcting system may apply a convolutional neural network on character grid and the document information. The convolutional neural network may output corrected document information, a correctness value indicating the possible errors in the document information, and a confidence value indicating a likelihood of the possible errors.

20 Claims, 6 Drawing Sheets

//  MODEL-INDEPENDENT CONFIDENCE VALUES FOR EXTRACTED DOCUMENT INFORMATION USING A CONVOLUTIONAL NEURAL NETWORK

CROSS-REFERENCE TO RELATED APPLICATION

This application is related to U.S. patent application Ser. No. 15/983,489, titled "Two-Dimensional Document Processing" to Reisswig et al. which is herein incorporated by reference in its entirety. This incorporation is not an acknowledgement that the related application constitutes prior art.

BACKGROUND

Information may be extracted from documents in a number of ways. Different extraction techniques by different extraction models may be used depending on the complexity of the document. For example, simple classes (such as serialized text) of a document may be extracted via rule-based system; complex classes (such as text and spatial arrangement of the text) may be extracted using machine learning models. But evaluating the correctness of the extracted information—how accurately the extracted information matches with the original information from the document—can be challenging, especially when different extraction models are used. That is, determining whether the extracted output from either a rule-based or machine learning model is correct when compared to the original information can be complex. But such an evaluation of extracted information would be useful to not only ensure the correctness of the extracted information but also provide an understanding as to the accuracy of the extraction models that provided the extracted information.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
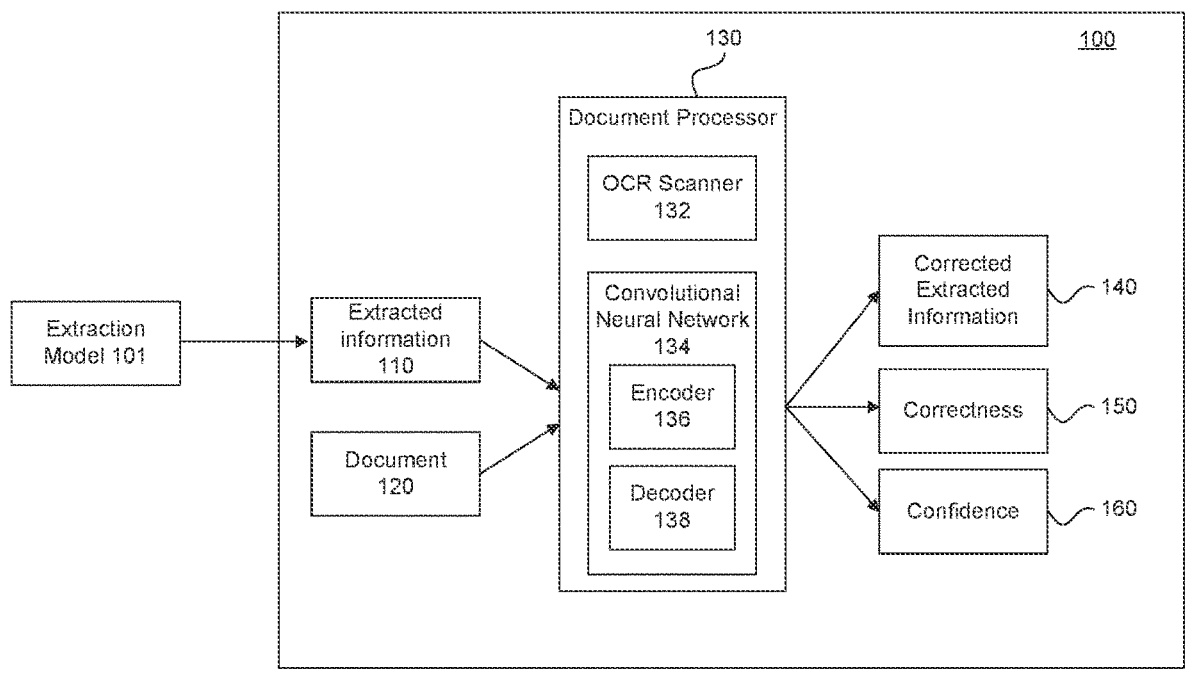
FIG. 1 depicts a block diagram of an example document processing environment, according to some embodiments.

Provided herein are system, apparatus, device, method and/or computer program product embodiments, and/or combinations and sub-combinations thereof, for evaluating and correcting extracted document information. A determination may be made whether correction is needed based on confidence and correctness scores that are generated by a convolutional neural network that processes the extracted document information along with the document itself. In an embodiment, the document correcting system disclosed herein may utilize as inputs extracted document information associated with a document along with the document itself, process and/or extract semantic information from the document for evaluating the extracted information, and correct the extracted document information on the basis of the semantic information.

In an embodiment, as part of evaluating the extracted information, the document correcting system may generate a confidence score that reflects a likelihood the extracted document information is a correct and complete representation of the original document. The confidence score may be implemented as a numerical value and may be compared to a selectable threshold value as part of evaluating the extracted information. The confidence score may be based on the number and types of errors detected in the extracted information. Examples of errors in the extracted information include false negatives (e.g., missing classes), false positives (e.g., added classes), class confusion (e.g., improper classification of a class within a document), and position errors (e.g., errors in the spatial arrangement of lines or words such as including/excluding lines, words that are positioned improperly on the document, wrong words in a class).

In addition to detecting errors in the extracted document information, the document correcting system may also correct the errors to produce corrected extracted document information. The confidence score may reflect the correctness of the extracted information and/or the correctness of the corrected extracted document information. In addition to or instead of correcting the extracted document information, the document correcting system may generate a correctness classification regarding the extracted document information without correcting the extracted document information. The correctness classification may be used to generate a confidence score regarding the correctness of the extracted information.

In an embodiment, the document correcting system is agnostic to the extraction model used to extract the document information. Extraction model may be external to and separate from the document process system. The document correcting system may utilize a convolutional neural network (CNN) to process both the extracted document information and the document for generating a confidence score regarding the likelihood of correctness of the extracted document information and a correctness value associated with extraction model (or models). In an embodiment, the convolutional neural network may be implemented using a denoising autoencoder which may be used for feature selection and extraction of document information. An implementation of the denoising encoder may assume that input data is already corrupted (incorrect) input data and, as output, reconstruct the corrupted input data to generate corrected input data.

The extracted document information and the document may be used as inputs for the CNN; in an embodiment, the document may first be down-sampled to a lower resolution version of the document. A lower resolution version may yield the advantage that the resulting character grid is simpler and smaller in size relative to the original document image. In an embodiment, the CNN processes the document to generate the corrected extracted information and compares the corrected extracted data to the inputted extracted document information for generating the confidence value.

The extracted information may be in the form of a prediction dictionary of key-value pairs or table information. The key-value pairs may represent, for example, classes and their respective values such as "Invoice Number" for the class and "12345" as the value if the document is an invoice. The key-value pairs in the prediction dictionary may correspond to different classes of words within the document. Examples of different classes include name, description, and summary. In an embodiment where the document is an invoice, classes may include vendor name and invoice number. The prediction dictionary may be used to generate additional inputs to the CNN such as a segmentation mask provides a pixel map of the different classes of words in the document. Another input may include at least one bounding box which indicates if there are more than one instance of a class in the document.

The CNN may also process the document to generate a character grid. In an embodiment, the CNN may generate the character grid utilizing text-based techniques and vision-based techniques to process a document as discussed in related application U.S. patent application Ser. No. 15/983, 489, which is hereby incorporated by reference in its entirety. The document may be processed to form a segmentation mask and bounding boxes both of which are pixel map representations of the document. The segmentation mask is a pixel map representation of classes of the document and may indicate their respective classes. Classes may depend on the type of document. For example, an invoice may have classes that include vendor name, vendor address, invoice number, and invoice total. The bounding boxes indicate positioning of the classes within the document.

An output of the CNN may be a corrected segmentation mask and corrected bounding boxes that reflect pixel level corrections to the segmentation mask and bounding boxes that were input into the CNN. On top, the CNN may output a correctness mask. Further detail regarding embodiments of correcting the extracted document information and generating a model-agnostic confidence score for the extracted document information will be discussed below and throughout this disclosure.

Various embodiments of these features will now be discussed with respect to the corresponding figures.

FIG. 1 depicts a block diagram depicting a document correcting environment 100, according to some embodiments. Document correcting environment 100 includes document processor 130 which may be implemented using one or more processors and/or may include hardware and/or software and may be configured to process both extracted document information and the documents associated with the extracted document information. Document processor 130 may include optical character recognition (OCR) scanner 132 and convolutional neural network (CNN) 134. CNN 134 may include encoder 136 and decoder 138. Document processor 130 may receive extracted information 110 and document 120 for processing. Extracted information 110 may be provided via extraction model 101 separate from document correcting environment 100. Extracted information 110 represents information extracted from document 120 by extraction model 101 and may include errors. Examples of errors in the extracted information include false negatives (e.g., missing classes), false positives (e.g., added classes), class confusion (e.g., improper classification of a class within a document such as mischaracterizing an a vendor name with a vendor address), and position errors (e.g., errors in the spatial arrangement of lines or words such as including/excluding lines, words that are positioned improperly on the document, wrong words in a class).

A reconstructed document may be generated based on extracted information 110; the reconstructed document is a version of document 120, which is the original document that was processed by extraction model 101. Accordingly, if extracted information 110 contains errors (for example, false positives, false negatives, class confusion, or position errors), then the reconstructed document may also contain these errors in comparison to the original document (i.e., document 120). Document 120 may be an image, PDF, word processing document, and/or other visual representation of data.

In an embodiment, document processor 130 may be configured to receive extracted information 110 and document 120 and determine the accuracy of extracted information 110 and separately processing document 120 to provide semantic information and/or data as a basis for comparing against extracted information 110. From extracted information 110 and document 120, document processor 130 may correct extracted information 110 (if there are any errors) to generate corrected extracted information 140, a correctness classification 150, and a confidence score 160. In an embodiment, confidence score 160 may be compared to a threshold value in determining whether document processor 130 in determining whether to correct extracted information 110.

Document processor 130 may be configured to process extracted information 110 before it is provided as input to CNN 134. Extracted information 110 is a representation of information that is extracted from document 120 by extraction model 101. In an embodiment, that representation may take the form of a prediction dictionary that comprises key-value pairs. The prediction dictionary may be implemented as a data structure that includes information for reconstructing extracted information 110. For example, the prediction dictionary may include information about classes of document 120, their respective values, and their spatial arrangement within document 120. In an example where document 120 is an invoice, the prediction dictionary may include classes of words in the invoice (e.g., Invoice Number, Invoice Amount, Vendor Name, Vendor Address) as keys in the dictionary and their respective values (e.g., 1234, $1,234), and their respective positions within the document. Accordingly, from extracted information 110, document processor 130 may reconstruct a version of document 120 as predicted by extraction model 101. If extracted information 110 includes errors (e.g., caused by errors in the extraction process), such as missing classes, missing values, improperly located classes, the reconstructed version of document 120 may also include errors. Document processor 130 may detect errors in extracted information 110 on the basis of the reconstructed version of document 120 and separately processing document 120.

Figure 2:
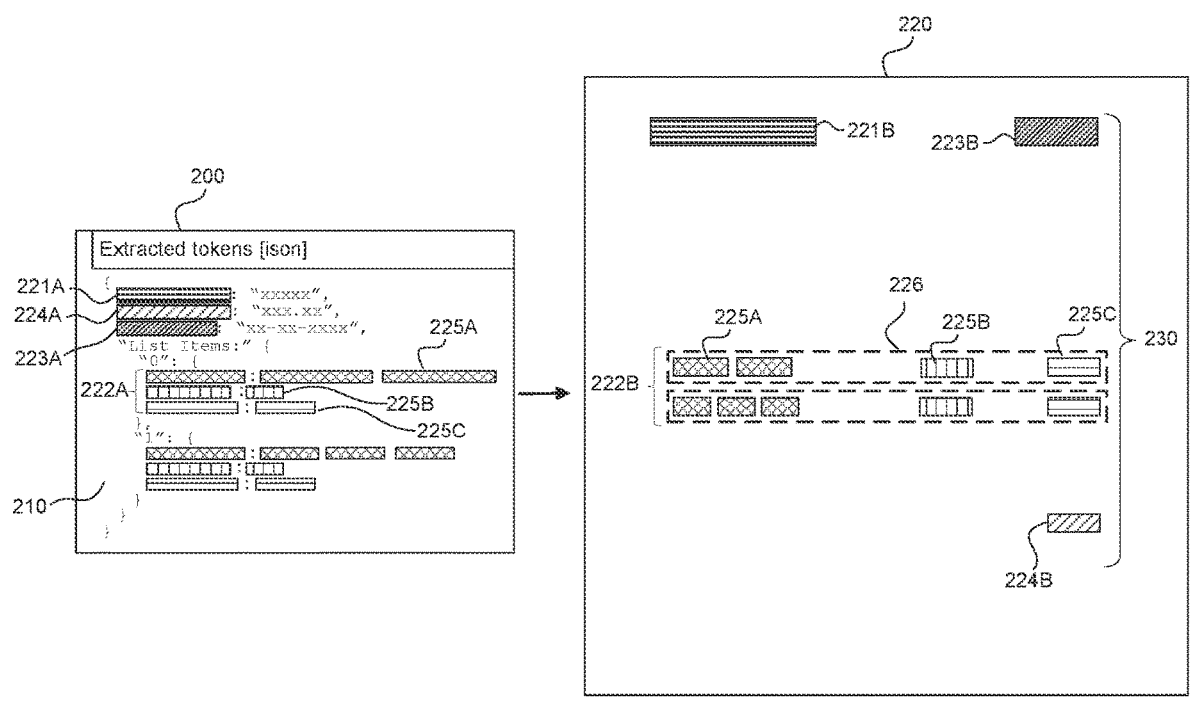
FIG. 2 depicts a block diagram of reconstructing a segmentation mask and bounding boxes from extracted information, according to some embodiments.

For example, FIG. 2 depicts a block diagram depicting extracted information 200 and reconstructed document 220. Reconstructed document 220 may be a reconstructed version of document 120 and reflects a prediction of document 120 by extraction model 101. In an embodiment, document 120 may be an invoice and reconstructed document 220 is a reconstructed invoice that is based on the information in extracted information 200. In an embodiment, extracted information 200 may be implemented as a prediction dictionary having key-value pairings. While discussion in this application may discuss embodiments where document 120 is an invoice, other types of documents may be processed and corrected in a similar manner by document correction environment 100.

Extracted information 200 may include extracted tokens representing characters or classes in document 120. The tokens may include keys 210 which may represent classes in document 120. Examples of keys 210 may include (but are not limited to) document identifier 221A (e.g., an invoice number, vendor name, vendor address), list item 222A, date information 223A, and summary 224A (e.g., invoice amount). Each list item 222A may comprise further classifications 225A-225C. In an embodiment where document 120 is an invoice, examples of these different classifications of list items may include quantity, description, and total cost.

Document processor 130 may be configured to process extracted information 200 to generate reconstructed document 220. Reconstructed document 220 comprises a reconstructed segmentation mask 230 represented by different classes 221B-224B corresponding to keys 210 in extracted information 200, such as document identifier 221B, list item 222B, date information 223B, and summary 224B, as well as reconstructed bounding boxes 226 which reflect multiple instances of list item 222B. List item 222B is populated with the values of the different classifications 225A-225C provided by the prediction dictionary. For example, in an embodiment where reconstructed document 220 is an invoice, classification 225A may indicate a description of list item 222B, classification 225B may indicate a quantity of list item 222B, and classification 225C may indicate a total price of list item 222B. Each classification 225A-225C may include a different number of words; for example, in FIG. 2, classification 225A has two words and classifications 225B-C each have one word. While reconstructed segmentation mask 230 and reconstructed bounding boxes 226 are shown together in reconstructed document 220, they are processed separately as will be further discussed below.

Returning to FIG. 1, in addition to processing extracted information 110, document processor 130 may be configured to separately process document 120 as part of determining confidence score 160 of extracted information 110. Document processor 130 may be configured to detect semantic information, such as classes, values, and spatial arrangements of characters, of document 120. In an embodiment when document 120 is implemented as an invoice, document processor 130 may determine that document 120 is an invoice based on the content and spatial arrangement of the content. Document processor 130 may further extract document information and identify classes of content in document 120. Examples of classes when document 120 is implemented as an invoice include a document identifier such as an invoice number, different categories of information such as quantity and price, date information, summary sale information and named entity information. Because document processor 130 is processing the original document on which extracted information 110 is based (i.e., document 120), document processor 130 may generate confidence score 160 on the basis of false negatives (e.g., missing classes) in extracted information 110.

Document processor 130 may utilize OCR scanner 132 as part of processing document 120. OCR scanner 132 may be a module executed by one or more processors of document processor 130. OCR scanner 132 may analyze the document to extract, for example, string information and/or position information related to the characters of document 120. In an embodiment, document 120 may include two-dimensional layout information and/or metadata. In an embodiment, OCR scanner 132 may determine bounding boxes in document 120. A bounding box may represent a pixel area occupied by a word or phrase in document 120.

The difference between segmentation masks and bounding boxes will now be explained. A segmentation mask may provide classification of words within document 120. For example, if document 120 is an invoice, a segmentation mask for document 120 may indicate different classes such as vendor name, vendor address, invoice number, invoice total, and invoice line items. Bounding boxes may be used to identify separate instances of the same class and their positioning within document 120. For example, bounding boxes may not be needed identify a single instance of a vendor name or a single instance of a vendor address. However, if there are multiple instances of a class, such as invoice line items, bounding boxes may identify each of these separate instances. Bounding boxes may be represented as a pixel-wise tensor or a multi-dimensional array which provide coordinate locations of the separate instances in document 120.

As another example, referring to FIG. 2, bounding boxes 226 may indicate multiple instances of list item 222B. In an embodiment where reconstructed document 220 is an invoice, list item 222B may reflect line items of the invoice, and bounding boxes 226 may indicate separate instances of each line item. OCR scanner 132 may also determine the spatial arrangement of bounding boxes 226 in relation to other bounding boxes in document 120 and bounding boxes 226 may include coordinates or a relative pixel location to identify the location of bounding boxes 226 in reconstructed document 220. Document processor 130 may generate a character grid based on the information detected by OCR scanner 132. The character grid may represent a down-sampled version of document 120. The character grid may comprise cells corresponding to characters of document 120.

After generating the reconstructed segmentation mask 230 (with its associated classes), reconstructed bounding boxes 226, and a character grid for document 120, document processor 130 may pass them as inputs to CNN 134. CNN 134 may include encoder 136 and/or a decoder 138. As noted above, CNN 134 may be implemented as a denoising autoencoder that processes the reconstructed segmentation mask 230, reconstructed bounding boxes 226, and character grid to determine the accuracy of extracted information 110. An autoencoder is a neural network where the output of the neural network is intended to be the same as the input; the autoencoder processes the input to create down-sampled representation of the input and then attempts to reconstruct the input by up-sampling the down-sampled representation to generate an output. In other words, the autoencoder is attempting to generate an output from the down-sampled representation that is as close as possible to the input. A denoising autoencoder is a type of autoencoder that intentionally corrupts input values prior to processing. Accordingly, a denoising autoencoder attempts to reconstruct the uncorrupted input value by generating output values based on determining the applied corruption (i.e., error).

When CNN 134 is implemented as a denoising autoencoder, the reconstructed segmentation mask 230 and reconstructed bounding boxes 226 are assumed to be already corrupted (i.e., incorrect) and they are passed as inputs to CNN 134 with the goal of detecting the corruption in the inputs. CNN 134 may generate an output that is a corrected version of extracted information 110 such as a corrected reconstructed segmentation mask and corrected bounding boxes. In an additional embodiment, CNN 134 may generate an explicit correctness mask that indicates whether each character pixel and associated reconstructed segmentation mask in the input is correct. The correctness mask could be directly computed from the difference between the reconstructed segmentation mask 230 and the corrected version of the extracted information. In practice, CNN 134 uses a separate output for the correctness that is independently predicted as an additional output to corrected segmentation mask and corrected bounding boxes. Encoder 136 may aid in determining semantic meaning of the character grid to be used to evaluate the correctness of reconstructed segmentation mask 230 and reconstructed bounding boxes 226 (and by extension, extracted information 110).

As part of this evaluation, CNN 134 may extract relevant information from the character grid generated from document 120. Since CNN 134 is conditioned on the extracted information 110, the extraction performed by CNN 134 is assumed to be accurate and therefore the extraction information generated by CNN 134 is also assumed to be accurate. Accordingly, document 120 is used as the ground truth or the target for evaluating extracted information 110.

In a separate step (e.g., prior to evaluating extracted information 110), CNN 134 may undergo training. CNN 134 may be trained to identify different semantic classes in document 120. For example, a semantic class (or class) may be the different types of words found in an invoice document such as invoice number, vendor name, and vendor address. CNN 134 may be trained to identify the invoice number, the vendor name, and the vendor address (among other classes) when analyzing the character grid. By associating words from document 120 with a corresponding class (e.g., named entity), document processor 130 may provide semantic meaning to document 120. When analyzing an invoice, for example, document processor 130 may further extract invoice information such as product descriptions, the quantity of a purchase, the price of a purchase, or the amount of a purchase.

CNN 134 may identify classes within document 120 such as a name, an address, a document identifier, line items, a summary information. Document processor 130 may further be configured to determine the document type of document 120 (e.g., contract, invoice) and the classes within document 120 (e.g., invoice number, invoice total, vendor name, vendor address). To determine the document type of document 120, document processor 130 may analyze the particular arrangement of classes in document 120. For example, identifying the presence of the invoice number in the upper left portion of document 120 may indicate a greater likelihood that document 120 is an invoice or a summary (i.e., invoice total) in the lower right portion of document 120. CNN 134 may be trained to identify these patterns to process document 120 and determine the correctness of extracted information 110.

Returning to the processing extracted information 110 and the character grid of document 120, encoder 136 may down-sample each of the character grid representing document 120, reconstructed segmentation mask 230, and bounding boxes 226 to generate an abstract representation of a reconstructed document. As previously noted, reconstructed document 220 is a version of document 120. Down-sampling means reducing the resolution of information in extracted information 110 and document 120 which results in the generation of a representation by encoder 136. The representation, while containing less information than extracted information 110, maintains sufficient information to generate a reconstructed document.

In an embodiment, encoder 136 down-samples extracted information 110 which comprises reconstructed segmentation mask 230 and bounding boxes 226, and document 120 independently in separate input branches. After down-sampling, output from each of the input branches may be merged into a representation that is the output of encoder 136. In an embodiment, encoder 136 may comprise one or more convolutional blocks where each block forms an input branch for processing each of the inputs into encoder 136. Each block of encoder 136 may use a down-sampling operation and may further comprise one or more convolutional layers each of which may comprise a convolutional operation, batch normalization, and rectified linear units (ReLU) activation.

The abstraction representation output by encoder 136 may then be fed into decoder 138 which up-samples the abstract representation to form corrected extracted information 140, correctness classification 150, and confidence score 160. This up-scaling is the process by which decoder 138 detects any potential errors in the inputs provided to encoder 136 (i.e., extracted information 110). Decoder 138 may comprise output branches each implemented as a convolutional block for up-sampling the abstract representation. In an embodiment, decoder 138 may have two independent output branches for generating a corrected reconstructed segmentation mask 230 and corrected bounding boxes, which forms corrected extracted information 140. The segmentation mask output branch may further also output a correctness mask that classifies for each character pixel whether the extracted information 110 is correct.

Decoder 138 may detect bounding boxes and generate reconstructed segmentation mask 230 to generate a 2D representation of the up-sampled representation. In an embodiment, reconstructed segmentation mask 230 displays the class assigned to each character or word. FIG. 2 depicts an example embodiment of a reconstructed document 220 that includes reconstructed segmentation mask 230 as represented by classes 221B-225B which may be considered to be semantic information related to reconstructed document 220. For example, reconstructed segmentation mask 230 of reconstructed document 220 may use patterns and/or colors to as part of visualizing the various classes in reconstructed document 220. Each class may be encoded via a number or a 1×N matrix (vector), also known as a one-hot vector which maps the data in reconstructed document 220 to integer values so that they can be represented as binary vectors. In an embodiment, reconstructed segmentation mask 230 may utilize a different pattern for each class within document 220. There may be strings (or values) associated with each of the classes. For example, an "invoice number" class may be associated with a numerical string (e.g., "1234").

In addition to producing reconstructed segmentation mask 230 corresponding to the various classes of the document, document processor 130 may generate bounding boxes such as bounding boxes 226 in FIG. 2. To generate bounding boxes 226, document processor 130 may identify different instances of a class as well as their associated strings. For example, document processor 130 may identify different instances of a line item class or an invoice number as well as their associated string such as "Quantity" or "1234." For example, document processor 130 may identify three instances of list item 222B in reconstructed document 220.

In addition to producing reconstructed segmentation mask 230 and bounding boxes 226, document processor 130 may generate a correctness mask. In an embodiment, a correctness mask indicates whether a reconstructed character is correct or incorrect such as by representing a correct reconstruction with a specific value and an incorrect construction with another value. For example, the correctness mask may take the value '1.0' for a character pixel where the reconstructed segmentation mask 230 is correct, and '0.0' if it is incorrect and hence requires corrected.

Figure 3:
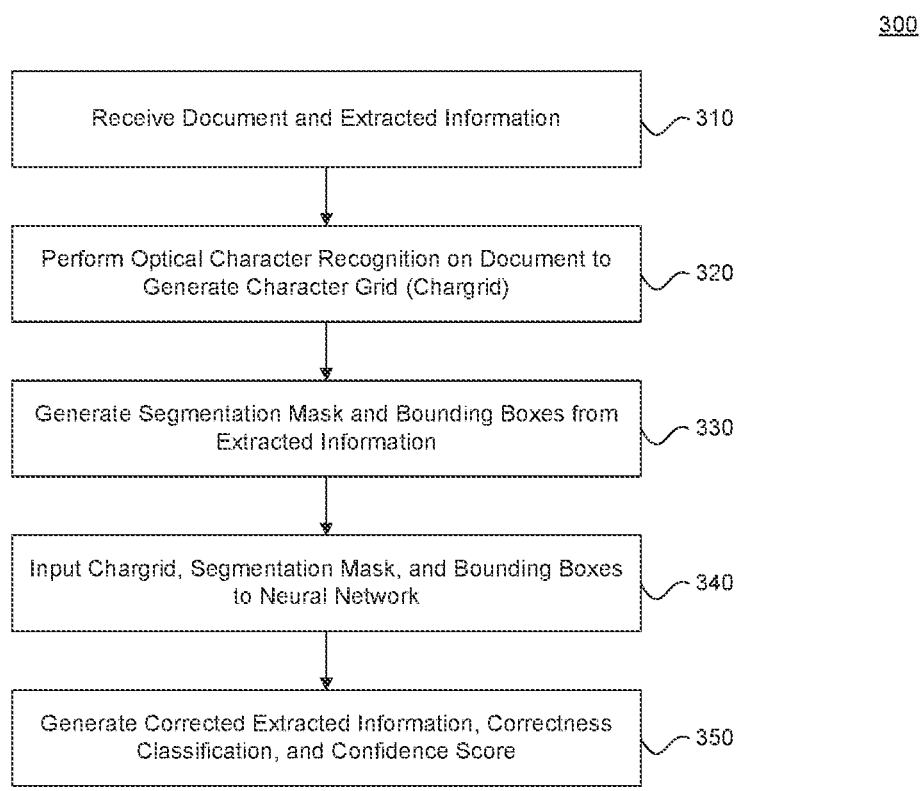
FIG. 3 depicts a flowchart illustrating a method for evaluating extracted document information and generating corrected document information, according to some embodiments.

FIG. 3 depicts a flowchart illustrating a method 300 for evaluating extracted document information and generating corrected document information, according to some embodiments. As a non-limiting example with regards to FIGS. 1 and 2, one or more processes described with respect to FIG. 3 may be performed by a document processor (e.g., document processor 130 of FIG. 1) for evaluating extracted document information, generating a confidence score for the correctness of the extracted document information, and providing corrected document information based on that evaluation and the confidence score. In such an embodiment, document processor 130 may execute code in memory to perform certain steps of method 300 of FIG. 3. While method 300 of FIG. 3 will be discussed below as being performed by document processor 130, other devices including may store the code and therefore may execute method 300 by directly executing the code. Accordingly, the following discussion of method 300 will refer to devices of FIG. 1 as an exemplary non-limiting embodiment of method 300. For example, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof. Moreover, it is to be appreciated that not all steps may be needed to perform the disclosure provided herein. Further, some of the steps may be performed simultaneously or in a different order than shown in FIG. 3, as will be understood by a person of ordinary skill in the art.

At 310, document processor 130 may receive extracted information 110 and document 120. Extracted information 110 may be provided to document processor 130 via extraction model 101 that is separate from document evaluation environment 100 and/or document processor 130. Document 120 may be any file that has text. For example, document 120 may be an image, word processing document, PDF file, screenshot, and/or a combination of text and images. In an embodiment, document 120 may be a scanned document and/or may contain multiple pages and/or slides.

At 320, document processor 130 may perform optical character recognition on document 120 to obtain character and position information. The character information may relate to letters, numbers, symbols, words, a collection or combination of letters, numbers, and/or symbols, symbolic mark, an image, and/or other visual indicators on document 120. Document processor 130 may utilize OCR scanner 132 to perform the character recognition. OCR scanner 132 may identify word and/or character strings and the location of the characters within document 120. OCR scanner 132 may perform a pixel based analysis to identify the characters and position information. The position information may indicate the spatial arrangement of the character information within document 120. That is, the position information indicates the location of characters in document 120 such as via coordinates or a grid-based system. Performing optical character recognition may also include generating a character grid for the document 120 using the character and position information. Generating the character grid may include replacing characters of document 120 with an index value. In an embodiment, an index value may be assigned via down-sampling using nearest neighbor interpolation. In an embodiment, document processor 130 may utilize a prediction dictionary to map a character to an index value. Generating index values for the characters allows document processor 130 to compile the character grid having index values for the characters contained within document 120. In an embodiment, generating the character grid may result in a down-sampled version of document 120. In this manner, character grid represents an encoding of the textual information, such as the words and their classes, and spatial arrangement information of document 120. In an embodiment, this encoding may take the form of a pixel map that visually indicates different types of classes and their positions in document 120.

At 330, document processor 130 may produce reconstructed segmentation mask 230, displaying the classes such as classes and bounding boxes from extracted information 110. Reconstructed document 220 in FIG. 2 depicts an example embodiment of reconstructed segmentation mask 230 with classes 221B-224B and bounding boxes 226 generated from extracted information 200. In an embodiment, extracted information 200 is analogous to extracted information 110. Extracted information 200 may include information regarding key-value pairs of classes and their associated values as extracted from document 120 (e.g., from extraction model 101). Based on the accuracy of the extraction process employed by extraction model 101, extracted information 200 may comprise incorrect (or corrupted) information. If extracted information 200 does include incorrect extraction information, then the corresponding reconstructed segmentation mask 230 and bounding boxes 226 may also be incorrect or be corrupt. Reconstructed document 220, which includes reconstructed segmentation mask 230 and bounding boxes 226, represents a recreation of document 120.

Regardless of their accuracy, classes 221B-224B of reconstructed segmentation mask 230 may include semantic information related to reconstructed document 220. For example, reconstructed segmentation mask 230 may use patterns and/or colors to visualize the portions of reconstructed document 220 with their corresponding class; as noted above, each class may be encoded using a 1-hot vector. Bounding boxes may identify different instances of a class. For example, in FIG. 2, bounding box 226 identify different instances of list item 222B.

At 340, after generating reconstructed document 220 from extracted information 110, document processor 130 may input reconstructed segmentation mask 230, bounding boxes 226, and the character grid generated for document 120 to convolutional neural network (CNN) 134. In an embodiment, CNN 134 determine the accuracy (or correctness) of extracted information 110 by further processing reconstructed segmentation mask 230 and bounding boxes 226. Part of this determination may involve the extraction of document information from the character grid and comparison of the extracted document information to reconstructed segmentation mask 230 and bounding boxes 226. This comparison may be used to score and detect false negatives such as missing classes (e.g., line items, invoice numbers, names) from document 120. In an embodiment, classes (e.g., line items, invoice numbers) are associated with a specific document type, so identification of the document type of document 120 enables CNN 134 to detect missing classes from reconstructed document 220.

CNN 134 may be trained to identify errors in extracted information 110 such as false negatives (e.g., missing classes), false positives (e.g., added classes), class confusion (e.g., changing a class class), and position errors (e.g., errors in the spatial arrangement of lines or words such as including/excluding lines, words that are positioned improperly on the document, wrong words in a class). As noted above, detection of false negatives is possible because document 120 is also provided as input to document processor 130.

At 350, document processor 130 may generate corrected extracted document information along with a correctness classification and confidence score associated with any detected errors in extracted information 110. Corrections to extracted information 110 may include adding in missing classes to correct for false negatives, removing incorrect classes to correct false positives, classifying classes to the appropriate class to correct class confusion, and repositioning words/characters to correct position errors. Corrected extracted information 140 may comprise a corrected segmentation mask (that includes corrected classes or classes) and corrected bounding boxes. If extracted information 110 is determined to be correct (i.e., no errors), then the corrected extracted information 140 would be identical to extracted information 110.

Correction classification 150 may indicate the pixel-wise correctness of extracted information 110, and more specifically, of reconstructed segmentation mask 230. For example, as part of generating corrected extracted information 140, document processor may determine that the reconstructed segmentation mask 230 is correct or incorrect for a given character pixel.

Confidence score 160 may be calculated at a pixel-level from the correctness mask. That is, document processor 130 may determine the correctness for each pixel of the corrected segmentation mask of corrected extracted information 140. For example, a pixel may be indicated as correct (e.g., 1.0) or not correct (e.g., 0.0) and confidence score 160 may be calculated by aggregating the correctness of each pixel to arrive at a single value (e.g., by averaging). Confidence score 160 may therefore be provided as a single value but for each class (e.g., invoice amount, invoice number) within document 120; that is, there may be more than one confidence score 160 depending on the number of classes identified in document 120.

In an embodiment, confidence score 160 is based on cascading calculations. First, a calculation of a pixel-wise correctness score for each pixel, then aggregating the correctness scores from each pixel on a word level (i.e., to form a word ("invoice")), and then aggregating each the correctness scores from each word on a class level (i.e., "invoice number" for the invoice number class). Aggregation of scores may be any method that arrives at a single number such as averaging of the correctness scores or any minimum-maximum calculation.

In an embodiment, confidence score 160 may be generated directly from corrected extracted information 140. In this embodiment, confidence score 160 may reflect the confidence that the corrections made by CNN 134 are correct. Confidence score 160 may be calculated as described above with respect to pixel-wise correctness.

In an embodiment, confidence score 160 may be generated based on correction classification 150. In this embodiment, because correction classification 150 indicates pixel-wise correctness of extracted information 110, confidence score 160 may reflect the confidence in the correctness of extracted information 110. If confidence score 160 is above a certain threshold, CNN 134 may not need to correct extracted information 110.

Figure 4:
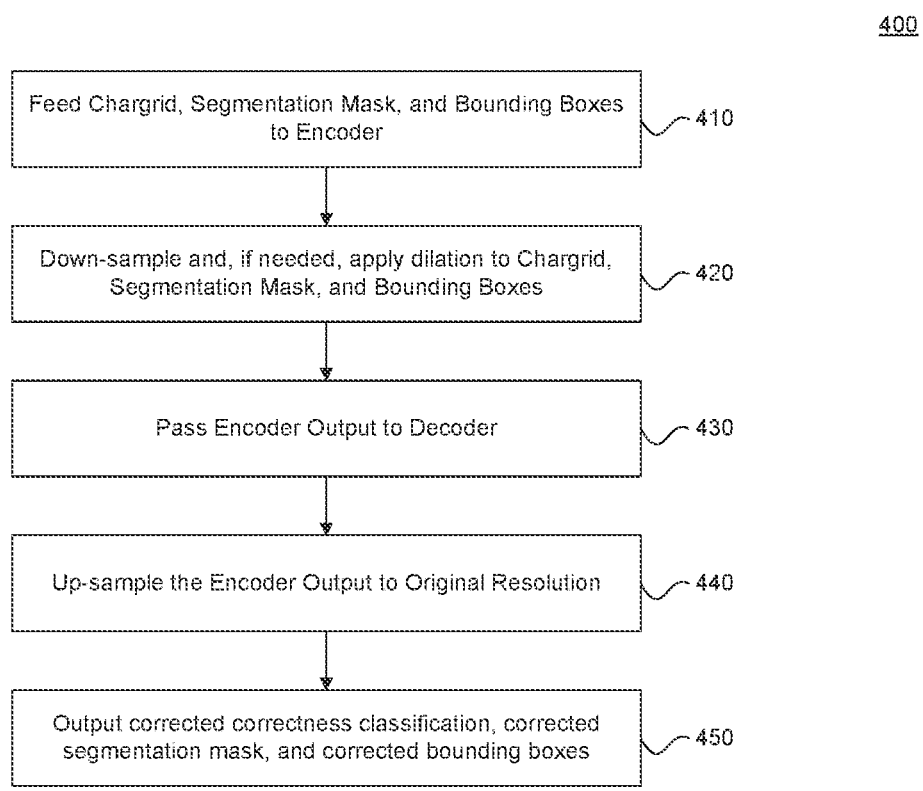
FIG. 4 depicts a flowchart illustrating a method for processing of certain inputs within a convolutional neural network, according to some embodiments.

FIG. 4 depicts a flowchart illustrating a method 400 depicts a flowchart illustrating a method for processing of certain inputs within a convolutional neural network. As a non-limiting example with regards to FIGS. 1 and 2, one or more processes described with respect to FIG. 4 may be performed by a convolutional neural network (e.g., CNN 134 of FIG. 1) for down-scaling and up-scaling information to generate corrected document information. In such an embodiment, CNN 134 may execute code in memory to perform certain steps of method 400 of FIG. 4. While method 400 of FIG. 4 will be discussed below as being performed by CNN 134, other devices including may store the code and therefore may execute method 400 by directly executing the code. Accordingly, the following discussion of method 400 will refer to devices of FIG. 1 as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

At 410, the character grid generated by OCR scanner 132 from document 120 and the segmentation mask and bounding boxes generated from extracted information 110 are fed into encoder 136 of CNN 134 for processing.

At 420, encoder 136 applies down-sampling to these inputs. In an embodiment, encoder 136 may comprise convolutional blocks. Each block may be responsible for performing a down-sampling operation where the resolution of the input to each block is reduced in complexity while maintaining sufficient information to encode the original input. This may be performed by on a pixel level. In other words, encoder 136 effectively compresses each of the inputs. In an embodiment, there are separate block branches for each input. Each branch may down-sample each input separately—the character grid, the segmentation mask, and the bounding boxes separately. The outputs from each of the block branches may then be merged into a single input into another convolutional block where additional down-sampling may then be performed. At this convolutional block (after the inputs have been merged), dilation may be applied. Dilation may inflate the input by inserting spaces between the elements of the input. Dilations increase the receptive class of the input while retaining the same resolution without increasing the computational complexity for encoder 136.

At 430, output from encoder 136 is then passed to decoder 138. The output may be an abstract representation of the inputs. Because the output represents a down-sampled and merged version of the inputs, the output is a compressed information that maintains the information needed to reconstruct the inputs by decoder 138.

At 440, decoder 138 may then up-sample the output provided by encoder 136 with the goal being to reconstruct the inputs from the compressed information in the output. Like encoder 136, decoder 138 may comprise multiple convolutional blocks. However, the blocks in decoder 138 are responsible for up-sampling, or increasing the resolution of the information from the output provided by encoder 136. As previously noted, up-sampling the output form encoder 136 results in reconstructing information from the output back to the original resolution of the inputs to encoder 136.

In an embodiment, decoder 138 has independent block branches for separately generating a corrected segmentation mask and separately generating corrected bounding boxes. The result of the branches is an up-sampled corrected segmentation mask (i.e., the original input segmentation mask with any needed corrections) and up-sampled corrected bounding boxes (i.e., the original input bounding boxes with any needed corrections).

At 450, document processor 130 outputs the corrected segmentation mask and corrected bounding boxes as corrected extracted information 140. Document processor also outputs a correctness classification associated with each of the classes identified in extracted information 110 and a confidence score associated with each of the classes. Calculation of the confidence score was discussed with regard to FIG. 3.

Figure 5:
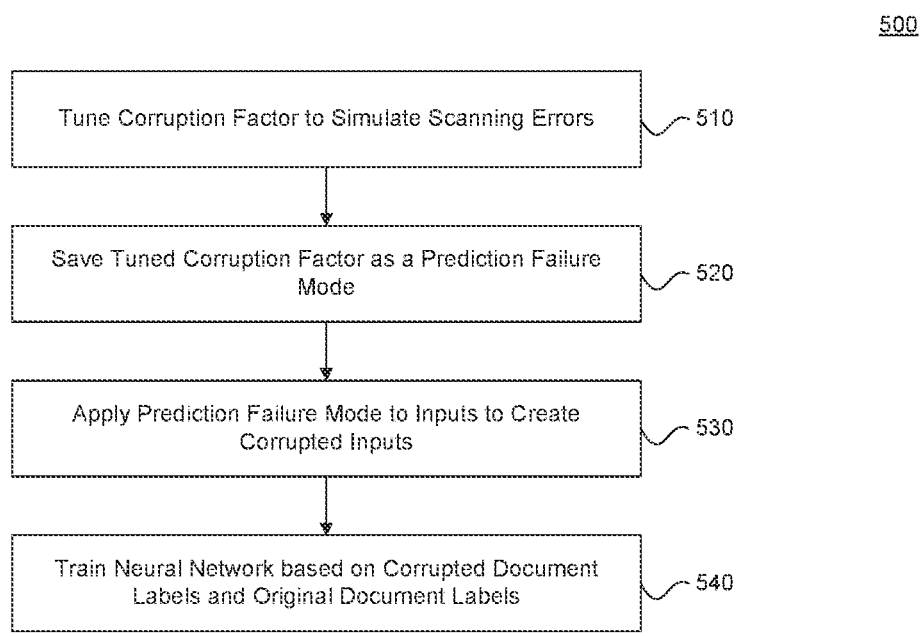
FIG. 5 depicts a flowchart illustrating a method for training a convolutional neural network, according to some embodiments.

FIG. 5 depicts a flowchart illustrating a method 500 depicts a flowchart illustrating a method for training a convolutional neural network. As a non-limiting example with regards to FIGS. 1 and 2, one or more processes described with respect to FIG. 5 may be performed by a convolutional neural network (e.g., convolutional neural network 134 of FIG. 1) for evaluating extracted document information, generating a confidence score for the correctness of the extracted document information, and providing corrected document information based on that evaluation and the confidence score. In such an embodiment, document processor 130 may execute code in memory to perform certain steps of method 500 of FIG. 5. While method 500 of FIG. 5 will be discussed below as being performed by document processor 130, other devices including may store the code and therefore may execute method 500 by directly executing the code. Accordingly, the following discussion of method 500 will refer to devices of FIG. 1 as an exemplary non-limiting embodiment of method 500. Moreover, it is to be appreciated that not all steps may be needed to perform the disclosure provided herein. Further, some of the steps may be performed simultaneously or in a different order than shown in FIG. 5, as will be understood by a person of ordinary skill in the art.

At 510, training CNN 134 involves tuning a corruption factor to simulate scanning errors by extraction model 101. The corruption factor forces CNN 134 (e.g., a denoising autoencoder) to purposefully corrupt (e.g., introduce errors) to provided inputs. Examples of errors to be introduced into inputs may include false negatives (e.g., missing classes), false positives (e.g., added classes), class confusion (e.g., changing a class class such as mischaracterizing an a vendor name with a vendor address), and position errors (e.g., errors in the spatial arrangement of lines or words such as including/excluding lines, words that are positioned improperly on the document, wrong words in a class). Accordingly, the corruption factor may be tuned to account for one or all of these potential errors which would train CNN 134 to recognize each one when processing and correcting extracted information. Once tuned, the corruption factor simulates imperfect (external) model predictions by randomly applying certain types of prediction failure modes like false positives and false negatives.

At 520, the tuned corruption factor may be stored as a prediction failure mode corresponding to the particular scanning error or errors. An advantage of the prediction failure mode is the capability of training CNN 134 for different failure modes based on extraction model 101 and/or the document type. For example, extraction model 101 may be prone to false negatives for a given class. So to train CNN 134 for this particular extraction model, the corruption factor may be tuned by increasing the probability of dropping that given class in inputs so that it sees more inputs with that class dropped. As another example, a particular document type may be prone to confusing particular classes (e.g., vendor name, vendor address) that tend to be proximate to each other within a document. Accordingly, the corruption factor may be tuned to increase the probability of confusing these classes when corrupting inputs to CNN 134 during training.

At 530, inputs CNN 134 begins based on the prediction failure mode which is applied to the original inputs to create corrupted inputs. In embodiment, the original inputs are original document labels associated with a document and the corrupted inputs are corrupted document labels. The original (uncorrupted) labels may be used as training targets for corrected predictions as well as for the determining the correctness classification. In an embodiment, the correctness classification may be a simple pixel-wise binary classifier trained using binary cross entropy loss with the corrupted inputs and original inputs.

At 540, training of CNN 134 begins based on the corrupted inputs. The corrected predictions may be trained using cross entropy loss with the original inputs as training targets. This is similar to document 120 being used as the original target for comparing to reconstructed document 220 (based on extracted information 110).

Figure 6:
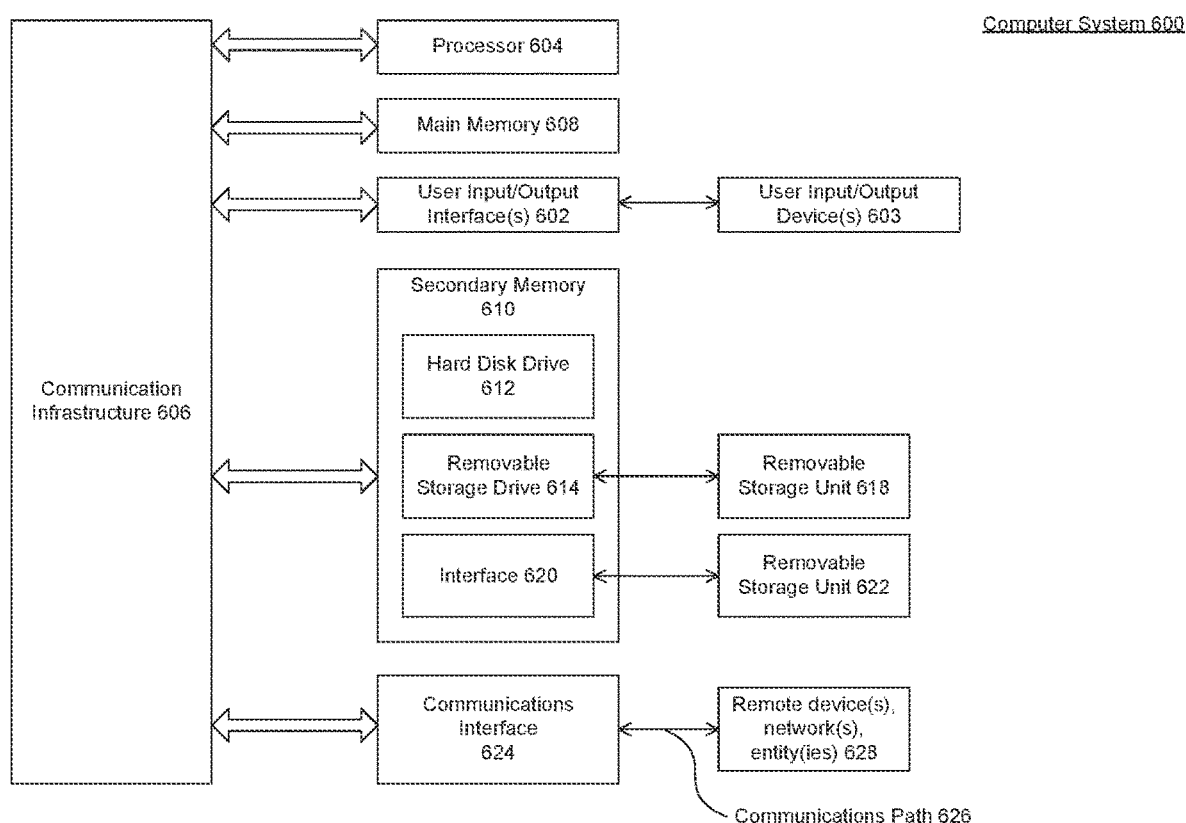
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in document correction environment 100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary classes and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to classes and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving document information and a document, wherein the document information represents information extracted from the document;
performing optical character recognition on the document;
generating a character grid using character information obtained from the optical character recognition, wherein the character grid encodes textual information and a spatial arrangement of the document;

inputting the character grid and the document information to a convolutional neural network;

detecting, by the convolutional neural network and based on the character grid, a potential error in the document information;

generating, based on the detected potential error, a confidence score associated with the document information; and generating corrected document information based on the confidence score, wherein the corrected document information represents a corrected version of the document information.

2. The computer implemented method of claim 1, wherein the corrected document information includes a corrected segmentation mask depicting corrected semantic data of the document and at least one corrected bounding box indicating corrected instances of a semantic class in the document.

3. The computer implemented method of claim 1, wherein the document information includes a predicted segmentation mask depicting predicted semantic data of the document and at least one predicted bounding box indicating a predicted instance of a semantic class in the document.

4. The computer implemented method of claim 3, wherein detecting the potential error in the document information comprises identifying the potential error in at least one of the predicted semantic data or the predicted instance of the semantic class.

5. The computer implemented method of claim 3, further comprising:

reconstructing a second document based on the predicted segmentation mask and the at least one predicted bounding box, wherein the second document represents a version of the document as determined by the document information.

6. The computer implemented method of claim 5, wherein the potential error comprises a prediction error in the second document in comparison to the document and wherein the prediction error comprises at least one of a false negative indicating a missing class from the second document, a false positive indicating an added class to the second document, a class confusion indicating an error in classifying a class in the second document, and a position error in the second document.

7. The computer implemented method of claim 1, wherein the document information comprises extracted textual information and extracted spatial arrangement information, the computer implemented method further comprising:

generating, based on the extracted textual information and the extracted spatial arrangement information, a predicted character grid.

8. A system, comprising:

a memory; and at least one processor coupled to the memory and configured to:

receive document information and a document, wherein the document information represents information extracted from the document;

perform optical character recognition on the document;

generate a character grid using character information obtained from the optical character recognition, wherein the character grid encodes textual information and a spatial arrangement of the document;

input the character grid and the document information in a convolutional neural network;

detect, by the convolutional neural network and based on the character grid, a potential error in the document information;

generate, based on the detected potential error, a confidence score associated with the document information; and generate corrected document information based on the confidence score, wherein the corrected document information represents a corrected version of the document information.

9. The system of claim 8, wherein the corrected document information includes a corrected segmentation mask depicting corrected semantic data of the document and at least one corrected bounding box indicating corrected instances of a semantic class in the document.

10. The system of claim 8, wherein the document information includes a predicted segmentation mask depicting predicted semantic data of the document and at least one predicted bounding box indicating a predicted instance of a semantic class in the document.

11. The system of claim 10, wherein detecting the potential error in the document information comprises identifying the potential error in at least one of the predicted semantic data or the predicted instance of the semantic class.

12. The system of claim 10, the at least one processor further configured to:

reconstruct a second document based on the predicted segmentation mask and the at least one predicted bounding box, wherein the second document represents a version of the document as determined by the document information.

13. The system of claim 12, wherein the potential error comprises a prediction error in the second document in comparison to the document and wherein the prediction error comprises at least one of a false negative indicating a missing class from the second document, a false positive indicating an added class to the second document, a class confusion indicating an error in classifying a class in the second document, and a position error in the second document.

14. The system of claim 8, wherein the document information comprises extracted textual information and extracted spatial arrangement information, the at least one processor further configured to:

generate, based on the extracted textual information and the extracted spatial arrangement information, a predicted character grid.

15. A non-transitory computer-readable device having instructions stored thereon that, when executed by at least one computing device, cause the at least one computing device to perform operations comprising:

receiving document information and a document, wherein the document information represents information extracted from the document;

performing optical character recognition on the document;

generating a character grid using character information obtained from the optical character recognition, wherein the character grid encodes textual information and a spatial arrangement of the document;

inputting the character grid and the document information in a convolutional neural network;

detecting, by the convolutional neural network and based on the character grid, a potential error in the document information;

generating, based on the detected potential error, a confidence score associated with the document information; and generating corrected document information based on the confidence score, wherein the corrected document information represents a corrected version of the document information.

16. The non-transitory computer-readable device of claim 15, wherein the corrected document information includes a corrected segmentation mask depicting corrected semantic data of the document and at least one corrected bounding box indicating corrected instances of a semantic class in the document.

17. The non-transitory computer-readable device of claim 15, wherein the document information includes a predicted segmentation mask depicting predicted semantic data of the document and at least one predicted bounding box indicating a predicted instance of a semantic class in the document.

18. The non-transitory computer-readable device of claim 17, wherein detecting the potential error in the document information comprises identifying the potential error in at least one of the predicted semantic data or the predicted instance of the semantic class.

19. The non-transitory computer-readable device of claim 17, the operations further comprising:
reconstructing a second document based on the predicted segmentation mask and the at least one predicted bounding box, wherein the second document represents a version of the document as determined by the document information.

20. The non-transitory computer-readable device of claim 19, wherein the potential error comprises a prediction error in the second document in comparison to the document and wherein the prediction error comprises at least one of a false negative indicating a missing class from the second document, a false positive indicating an added class to the second document, a class confusion indicating an error in classifying a class in the second document, and a position error in the second document.

* * * * *